Aug. 16, 1960 J. M. HAUSMAN 2,948,920
ALIGNED DOUBLE CYLINDERS AND RAMS FOR PLASTIC MIXING APPARATUS
Filed Oct. 28, 1957

INVENTOR.
JOHN M. HAUSMAN

BY

ATTYS.

United States Patent Office 2,948,920
Patented Aug. 16, 1960

2,948,920

ALIGNED DOUBLE CYLINDERS AND RAMS FOR PLASTIC MIXING APPARATUS

John M. Hausman, 3581 Edgewood Drive, Stow, Ohio

Filed Oct. 28, 1957, Ser. No. 692,873

2 Claims. (Cl. 18—2)

This invention relates to plastic mixing apparatus, and especially is of the type used for working and/or kneading of natural or synthetic rubber or other plastic material to render it more plastic, and/or for mixing compounding ingredients therewith.

At the present time in the rubber working industries, crude natural rubber from the plantation is usually subjected to a "breakdown" or plasticizing operation prior to attempting to mix any compounding ingredients therewith. Thus such operation is first performed upon the rubber after which the rubber and suitable compounding ingredients, such as carbon black, may be placed into what is called a banbury mixer where the rubber is thoroughly kneaded and mixed with the compounding materials to make what is called a master batch. Thereafter yet a third operation of mixing and/or kneading the rubber is performed by mixing such master batches of rubber with other compounding ingredients, natural or synthetic rubber materials, etc. upon rubber mixing mills to provide the actual batch of rubber for use in making a given article.

In making many rubber articles, such as rubber tire treads, the rubber material or composition, after it has had the three different operations performed thereon by three different machines as set forth hereinabove, is transmitted to an extrusion apparatus in which the plasticized, compounded rubber is further processed and is extruded therefrom as a continuous article of the cross-sectional contour desired.

Other similar operations are performed in many instances upon synthetic materials such as synthetic rubber and rubber-like materials, while yet other plastic materials may be processed similarly to the operations referred to hereinbefore as being performed upon natural rubber.

The general object of the present invention is to provide a new and improved machine for plasticizing and/or compounding plastic materials to replace one or more previous conventional types of plastic compounding and/or processing apparatus.

Another object of the invention is to provide a unitary machine which can perform plasticizing, compounding and/or extruding operations upon plastic materials.

A further object of the invention is to provide a pair of aligned cylinders and rams with an apertured mixing plate connecting the open ends of the cylinders to provide a plastic processing machine wherein plastic material is processed by forcing it to flow back and forth through the apertures in the mixing plate connecting the two cylinders of the machine together.

A further object of the invention is to reduce the cost of the machinery used for processing and/or compounding plastic materials, and to reduce the amount of labor involved in such operations.

Yet another object of the invention is to control, positively, the movement of plastic material in processing apparatus so that all of the material in one batch, or in a plurality of batches can be uniformly processed.

The foregoing and other objects and advantages of the invention will be made more apparent as the specification proceeds.

Attention now is particularly directed to the accompanying drawings wherein apparatus embodying the principles of the invention is shown, and wherein.

When referring to corresponding parts shown in the drawings and referred to in the specification, corresponding numerals are used to facilitate comparison therebetween.

Figure 1:
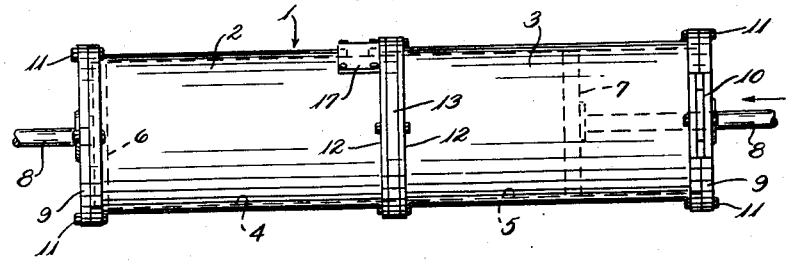
Fig. 1 is an elevation of a pair of aligned cylinder and ram means for working plastic materials.

The invention, in general, relates to plastic mixing or working apparatus comprising a pair of axially aligned cylinders that form plastic working chambers, an apertured mixing plate secured to the aligned cylinders and separating them but providing a connection between such working chambers through the apertures in the mixing plate, individual ram means in each cylinder for engaging plastic material therein and forcing it through the apertures in the mixing plate for working action on the plastic, and a discharge plate removably secured to a side wall portion of one of the cylinders adjacent the mixing plate so that plastic material can be forced from the pair of cylinders by the ram means when the discharge plate is removed.

Reference now is particularly directed to the details of the construction shown in the drawings, and the plastic mixing and/or working apparatus is indicated as a whole by the numeral 1. Such apparatus 1 includes a pair of aligned cylinders 2 and 3 that provide plastic mixing and/or working chambers 4 and 5, respectively. These cylinders 2 and 3 can be positioned in any suitable manner by conventional means (not shown). A ram 6 is slidably received in the cylinder 2, whereas a similar ram 7 is slidably engaged with the cylinder 3. These rams have control rods 8 extending therefrom for moving the rams 6 and 7 along the axes of the cylinders 2 and 3, as desired. Of course, these rams 6 and 7 can be considered to be pistons and the rods 8, piston rods as desired. In all events, means connect with the control rods 8 at points remote from the cylinders 2 and 3 for moving them axially at desired times and in desired relationships to each other. The control rods 8 extend through end plates 9 pivotally secured to the carrying cylinders by vertically extending hinges 10. Suitable means, such as cap screws or bolts 11, locks the end plate 9 to the associated cylinder for operative engagement therebetween and for closing the cylinders 2 and 3 to provide enclosed plastic working chambers therein. It will be realized that the end plates 9 carry the rams and control rods therein to swing them out from operative engagement with the cylinders 2 and 3 for loading any desired plastic material or compounding ingredients into the plastic working chambers 4 and 5.

Figure 2:
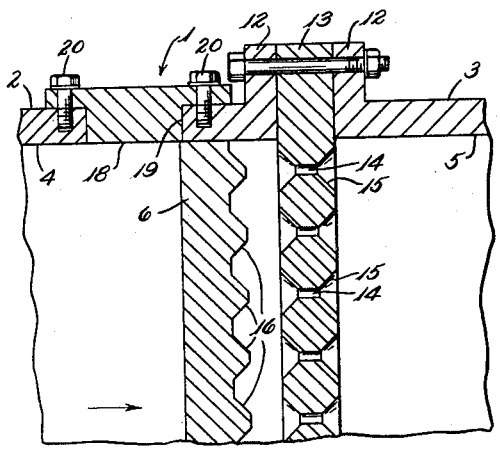
Fig. 2 is an enlarged fragmentary vertical section of the center portion and plastic working or mixing plate of the apparatus of Fig. 1.

Figs. 1 and 2 of the drawings show that the cylinders 2 and 3 are secured together by means of end flanges 12 provided thereon, which end flanges 12 abut against a mixing plate 13 having a plurality of plastic receiving and working apertures 14 extending therethrough in a direction parallel to the axes of the cylinders 2 and 3. These apertures 14 are distributed substantially uniformly around the entire surface of the mixing plate 13 and countersunk end portions 15 are provided at each end thereof to facilitate flow of plastic material into the apertures 14 and through them for a mixing, kneading, or working action, or the like while being processed in the apparatus 1. These apertures 14 are, for example, between about ¼ to ¾" in diameter dependent upon the diameter of the cylinders 2 and 3, the forces applied to the rams, etc.

Fig. 2 of the drawings best shows that a plurality of conically shaped bosses 16 are provided on the working face of the ram 6 and these bosses usually are formed integrally therewith. The bosses 16 are positioned in alignment with the apertures 14 and are shaped complementary to the countersunk ends 15 thereof. Thus when the ram 6 is moved up into contacting engagement with the mixing plate 13, all plastic material received within the plastic working chamber 4 initially will be forced into and most of it through these working apertures 14. If desired, the countersunk end sections of the apertures 14 could be enlarged axially to provide a smaller volume of apertures in which the plastic material would remain after the ram 6 has been moved axially as far as it can into engagement with the associated working face of the mixing plate 13.

Obviously the ram 7 is provided with a similar facial configuration to that shown for the ram 6.

In order to facilitate discharge of material from the plastic working apparatus p, a discharge plate 17 is provided. This plate 17 has a boss 18 thereon that engages and fills a discharge opening 19 provided in a side wall of the cylinder 2 adjacent the mixing plate 13. Cap screws 20 or the like can be used for securing the discharge plate 17 over the discharge opening 19. It will be seen that the inner surface of the boss 18 aligns with the inner wall of the cylinder 2 to permit the ram 6 to move smoothly along against the inner surface of this boss.

In some instances, it may be convenient to provide the discharge opening 19 immediately adjacent the working face of the mixing plate 13.

Figure 3:
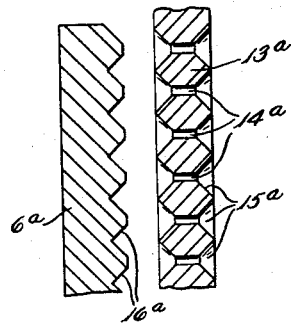
Fig. 3 is a fragmentary section of a modification of a plastic working plate and associated piston like that shown in Fig. 2.

Fig. 3 illustrates a modification of the structure shown in Figs. 1 and 2. In such embodiment of the invention, Fig. 3 shows a modified mixing plate 13a that has apertures 14a therein with the countersunk end portions 15a thereon. In this instance, the apertures 14a are positioned closely adjacent each other so that the countersunk end portions 15a all contact and/or intersect with each other. Hence, no flat surfaces are provided on the working face of the mixing plate 13a normal to the longitudinal axis of the cylinder 2. Likewise, the bosses 16a on the ram 6a are shaped complementary to and are positioned in alignment with the apertures 14a and countersunk ends 15a so that no space remains in the chamber for receiving plastic material when the ram 6a is brought into engagement with the mixing plate 13a.

Figure 4:
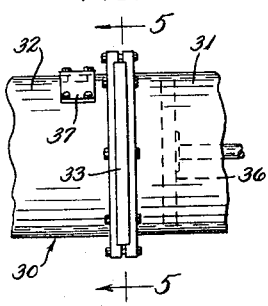
Fig. 4 is a fragmentary elevation of a further modification of apparatus of the invention.
Figure 5:
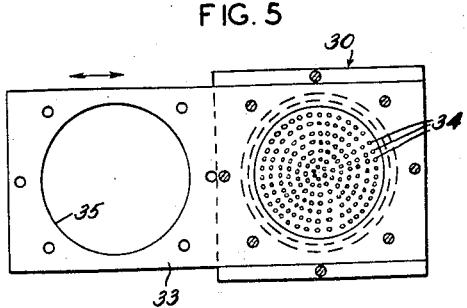
Fig. 5 is a vertical section taken on line 5—5 of Fig. 4.

Figs. 4 and 5 show a modification plastic working apparatus 30 of the invention. Such apparatus 30 includes a pair of aligned cylinders 31 and 32 with a slidably positioned plastic working plate 33 received between the cylinders 31 and 32. Such mixing plate 33 has a plurality of plastic working apertures 34 in one section thereof, whereas a discharge opening 35 is also provided in the mixing plate spaced laterally from the series of apertures 34 provided therein. The opening 35 is large enough to receive a ram 36 therein and pass the ram therethrough, should it be desired to move all of the plastic material being processed from the cylinder 31 into the cylinder 32.

Fig. 5 best indicates how the mixing plate 33 can have lateral movement provided therein and still engage with associated flanges provided on the ends of the cylinders 31 and 32. Of course, a discharge plate 37 like the discharge plate 17 is also provided in this embodiment of the invention. It should be realized that the mixing plate 33 may have any desired type of apertures and/or countersunk end portions provide therein. Thus the ram 36 can be moved longitudinally from the cylinder 31 into the cylinder 32 to facilitate complete discharge of material from the working chambers provided.

It should be realized that the apparatus of the invention is made of heavy metal members, or plates and that realtively large forces are employed to work solid, but flowable plastic materials into and through the apertures provided in the mixing plates of the invention. Such working and mixing of the plastic material effectively breaks down the solid components of the plastic material and makes the whole material more pliable. Usually the temperature of the material being processed will be increased and, if necessary, a cooling jacket could be placed around the apparatus of the invention.

The present invention is a continuation-in-part of my prior application, Serial No. 462,775, now Patent No. 2,813,300.

It also is possible to omit the discharge plate 37, for example, in the apparatus especially where a sliding or movable mixing plate like the plate 33 is provided. In such case, the plate 33 could be moved to align the aperture 35 with the working or mixing chambers and use one of the rams 36 to force all of the plastic material processed from the mixing chambers by swinging the other ram 36 out of its cylinder and moving the one ram the length of the two cylinders.

It is believed that the invention has provided a sturdy, compact and effective apparatus for mixing or working plastic materials such as rubber, synthetic rubbers, and various other plastic materials. Thus it is believed that the objects of the invention have been achieved.

While several complete embodiments of the invention have been disclosed herein, it will be appreciated that modification of these particular embodiments of the invention may be resorted to without departing from the scope of the invention as defined in the appended claims.

What I claim is:

1. Plastic mixing and/or working apparatus comprising a pair of axially aligned axially spaced cylinders of the same diameter providing plastic working chambers, a mixing plate having a plurality of plastic working apertures therein positioned between and axially separating said cylinders but providing a connection therebetween, said mixing plate being slidably engaged with said cylinders and having a discharge opening therein so that said plastic working apertures and said discharge opening can alternately be aligned with said cylinders, individual ram and piston means in each of said cylinders for forcing plastic material therefrom through said mixing plate, said piston means being of a size to pass through said discharge opening, and a discharge plate removably secured to a sidewall portion of one of said cylinders spaced from but adjacent said mixing plate whereby plastic material can be forced from the pair of cylinders by said ram means when said discharge plate is removed.

2. Plastic mixing and/or working apparatus comprising a pair of axially aligned axially continuous cylinders providing aligned closed plastic working chambers, an apertured mixing plate secured to adjacent ends of said cylinders together but providing a connection therebetween through the apertures in such mixing plate, indidividual ram means slidably received in each of said cylinders for forcing plastic material therefrom through said mixing plate, said mixing plate being adjustably engaged with said cylinders and having a series of plastic working apertures and one ram passing aperture therein alternately alignable with said cylinders, and closure means secured to said cylinders at the open ends thereof and positioning said ram means for sliding action in said cylinders.

References Cited in the file of this patent

UNITED STATES PATENTS

| | | |
|---|---|---|
| 90,766 | McClelland | June 1, 1869 |
| 2,135,395 | Holzapfel | Nov. 1, 1938 |
| 2,166,437 | Howie et al. | July 18, 1939 |
| 2,436,993 | Fisher | Mar. 2, 1948 |
| 2,566,293 | Robinson | Aug. 28, 1951 |
| 2,661,497 | Birmingham | Dec. 8, 1953 |
| 2,813,300 | Hausman | Nov. 19, 1957 |